US012725464B2

(12) United States Patent
Davis et al.

(10) Patent No.: US 12,725,464 B2
(45) Date of Patent: Sep. 1, 2026

(54) TRAILER LOAD DISTRIBUTION SENSING SYSTEMS AND METHODS

(71) Applicant: Torc Robotics, Inc., Blacksburg, VA (US)

(72) Inventors: William Gray Davis, Austin, TX (US); Hamzah Imtiaz Khan, Austin, TX (US); Joseph R. Fox-Rabinovitz, Austin, TX (US)

(73) Assignee: Torc Robotics, Inc., Blacksburg, VA (US)

( * ) Notice: Subject to any disclaimer, the term of this patent is extended or adjusted under 35 U.S.C. 154(b) by 101 days.

(21) Appl. No.: 18/739,013

(22) Filed: Jun. 10, 2024

(65) Prior Publication Data

US 2025/0378718 A1 Dec. 11, 2025

(51) Int. Cl.
*G07C 5/08* (2006.01)
*G01G 19/12* (2006.01)

(52) U.S. Cl.
CPC ............... *G07C 5/08* (2013.01); *G01G 19/12* (2013.01)

(58) Field of Classification Search
CPC ................................. G07C 5/08; G01G 19/12
USPC .......................................................... 701/23
See application file for complete search history.

(56) References Cited

U.S. PATENT DOCUMENTS

| | | | | |
|---|---|---|---|---|
| 10,906,406 | B1 | 2/2021 | Healy | |
| 11,220,255 | B2 | 1/2022 | Crawford | |
| 11,441,937 | B2 | 9/2022 | Zhang | |
| 11,499,812 | B2 | 11/2022 | Diehl | |
| 2022/0155130 | A1 | 5/2022 | Laine | |
| 2022/0196459 | A1 | 6/2022 | Song | |
| 2023/0004158 | A1* | 1/2023 | Switkes | G05D 1/0248 |

* cited by examiner

*Primary Examiner* — Maceeh Anwari
(74) *Attorney, Agent, or Firm* — Armstrong Teasdale LLP

(57) ABSTRACT

A system for monitoring a load distribution of an autonomous vehicle is provided. The system includes a processor in communication with a memory device. The processor is configured to receive weight data from a grid of weight sensors disposed on a cargo bed surface of the autonomous vehicle, generate a weight distribution map of the cargo bed surface based on the received weight data, the weight distribution map including an array of weight values, and control operation of the autonomous vehicle based in part on the generated weight distribution map.

15 Claims, 5 Drawing Sheets

TRAILER LOAD DISTRIBUTION SENSING SYSTEMS AND METHODS

TECHNICAL FIELD

The field of the disclosure relates generally to autonomous vehicles and, more specifically, to trailer load distribution sensing systems for autonomous vehicles.

BACKGROUND OF THE INVENTION

A distribution of weight within a trailer pulled by a truck impacts performance of the truck while driving. For this reason, autonomous trucks may be required to operate differently depending how weight in the trailer is distributed, which generally requires that the truck be operated under the assumption that the trailer is loaded in a certain predefined manner. However, this does not allow the autonomous vehicle to account for shifts in the load during travel or situations in which the trailer is loaded in an unexpected manner. A system that enables an autonomous truck to account for a real trailer load distribution while driving is therefore desirable.

This section is intended to introduce the reader to various aspects of art that may be related to various aspects of the present disclosure described or claimed below. This description is believed to be helpful in providing the reader with background information to facilitate a better understanding of the various aspects of the present disclosure. Accordingly, it should be understood that these statements are to be read in this light and not as admissions of prior art.

SUMMARY OF THE INVENTION

In one aspect, a system for monitoring a load distribution of an autonomous vehicle is provided. The system includes a processor in communication with a memory device. The processor is configured to receive weight data from a grid of weight sensors disposed on a cargo bed surface of the autonomous vehicle, generate a weight distribution map of the cargo bed surface based on the received weight data, the weight distribution map including an array of weight values, and control operation of the autonomous vehicle based in part on the generated weight distribution map.

In another aspect a method for monitoring a load distribution of an autonomous vehicle is provided. The method includes receiving weight data from a grid of weight sensors disposed on a cargo bed surface of the autonomous vehicle, generating a weight distribution map of the cargo bed surface based on the received weight data, the weight distribution map including an array of weight values, and controlling operation of the autonomous vehicle based in part on the generated weight distribution map.

In yet another aspect, a sensor system for monitoring a load distribution of an autonomous vehicle is provide. The sensory system includes a grid of weight sensors disposed on a cargo bed surface of the autonomous vehicle, a memory device, and a processor in communication with the grid of weight sensors and the memory device. The processor is configured to receive weight data from the grid of weight sensors, generate a weight distribution map of the cargo bed surface based on the received weight data, the weight distribution map including an array of weight values, and control operation of the autonomous vehicle based in part on the generated weight distribution map.

Various refinements exist of the features noted in relation to the above-mentioned aspects. Further features may also be incorporated in the above-mentioned aspects as well. These refinements and additional features may exist individually or in any combination. For instance, various features discussed below in relation to any of the illustrated examples may be incorporated into any of the above-described aspects, alone or in any combination.

BRIEF DESCRIPTION OF DRAWINGS

The following drawings form part of the present specification and are included to further demonstrate certain aspects of the present disclosure. The disclosure may be better understood by reference to one or more of these drawings in combination with the detailed description of specific embodiments presented herein.

Figure 1:
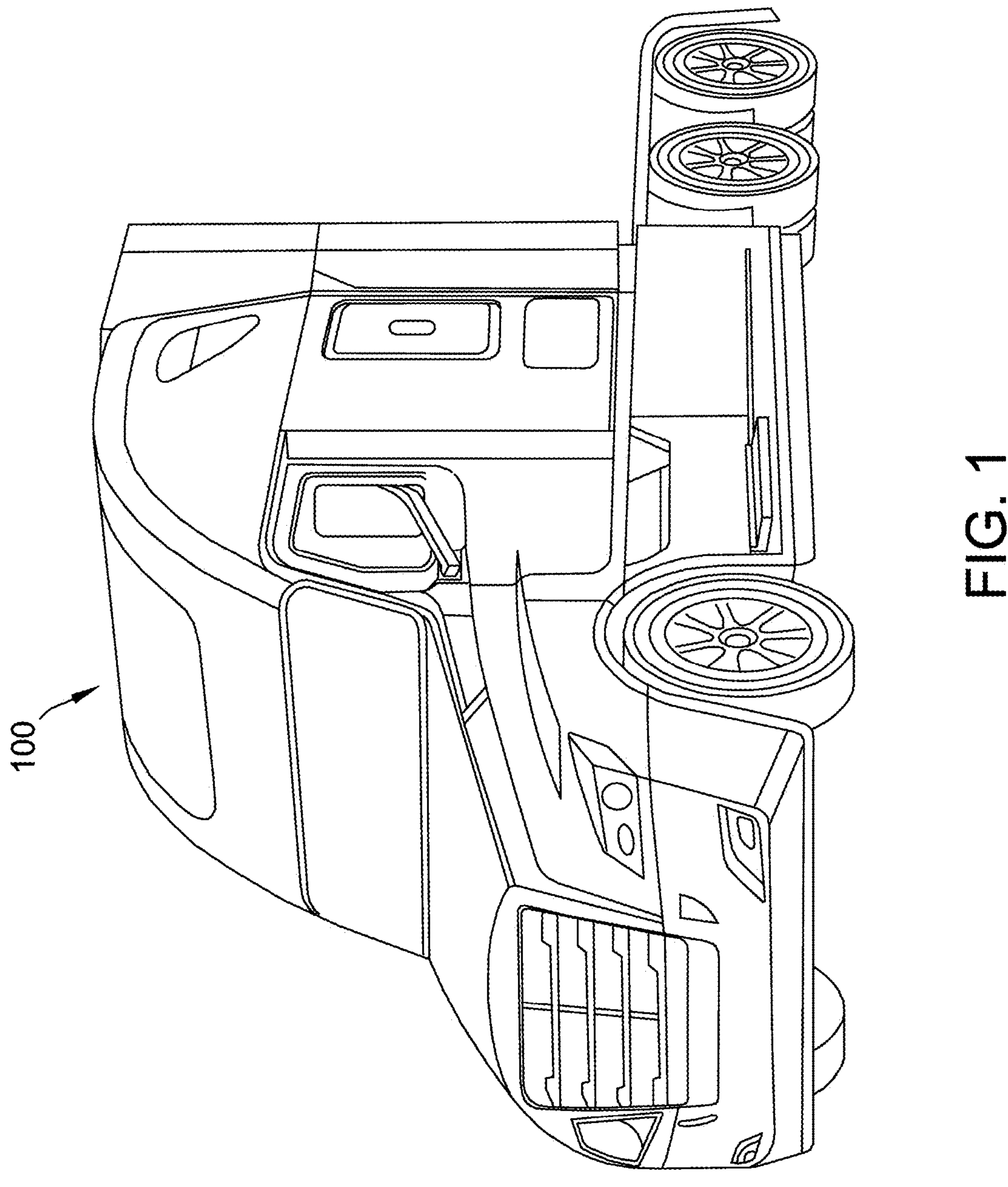
FIG. 1 is a schematic diagram of an autonomous vehicle.

Corresponding reference characters indicate corresponding parts throughout the several views of the drawings. Although specific features of various examples may be shown in some drawings and not in others, this is for convenience only. Any feature of any drawing may be referenced or claimed in combination with any feature of any other drawing. The drawings are not to scale unless otherwise noted.

DETAILED DESCRIPTION

The following detailed description and examples set forth preferred materials, components, and procedures used in accordance with the present disclosure. This description and these examples, however, are provided by way of illustration only, and nothing therein shall be deemed to be a limitation upon the overall scope of the present disclosure.

The disclosed systems and methods are described, for clarity, using certain terminology when referring to and describing relevant components within the disclosure. Where possible, common industry terminology is employed in a manner consistent with its accepted meaning. Unless otherwise stated, such terminology should be given a broad interpretation consistent with the context of the present application and the scope of the appended claims.

The embodiments described herein include a system for monitoring a load distribution of an autonomous vehicle. The system is configured to receive weight data from a mesh or grid of weight sensors disposed on a cargo bed surface of the autonomous vehicle (e.g., a surface of a trailer or integrated into the autonomous vehicle itself). The weight sensors include capacitance sensors or other sensors capable of determining weight is present at a corresponding location of the cargo bed surface. For example, the weight sensors may be capable of returning Boolean value or a quantitative weight measurement indicating weight, and therefore likely an object, is present at the location of the weight sensor. The system is further configured to generate a weight distribution map of the cargo bed surface based on the received weight data. The weight distribution map includes an array of weight values returned by the weight sensors that can be used to provide granular position information characterizing where objects, such as cargo load items, are located within the cargo bed surface. The system is further configured to control operation of the autonomous vehicle based in part on the generated weight distribution map or to identify alert conditions such as shifting loads or unsafe weight distributions. While generally described with respect to an autonomous vehicle, it should be appreciated that the system described herein can also be used for weight distribution monitoring in other types of cargo-carrying vehicles or machines.

Figure 2:
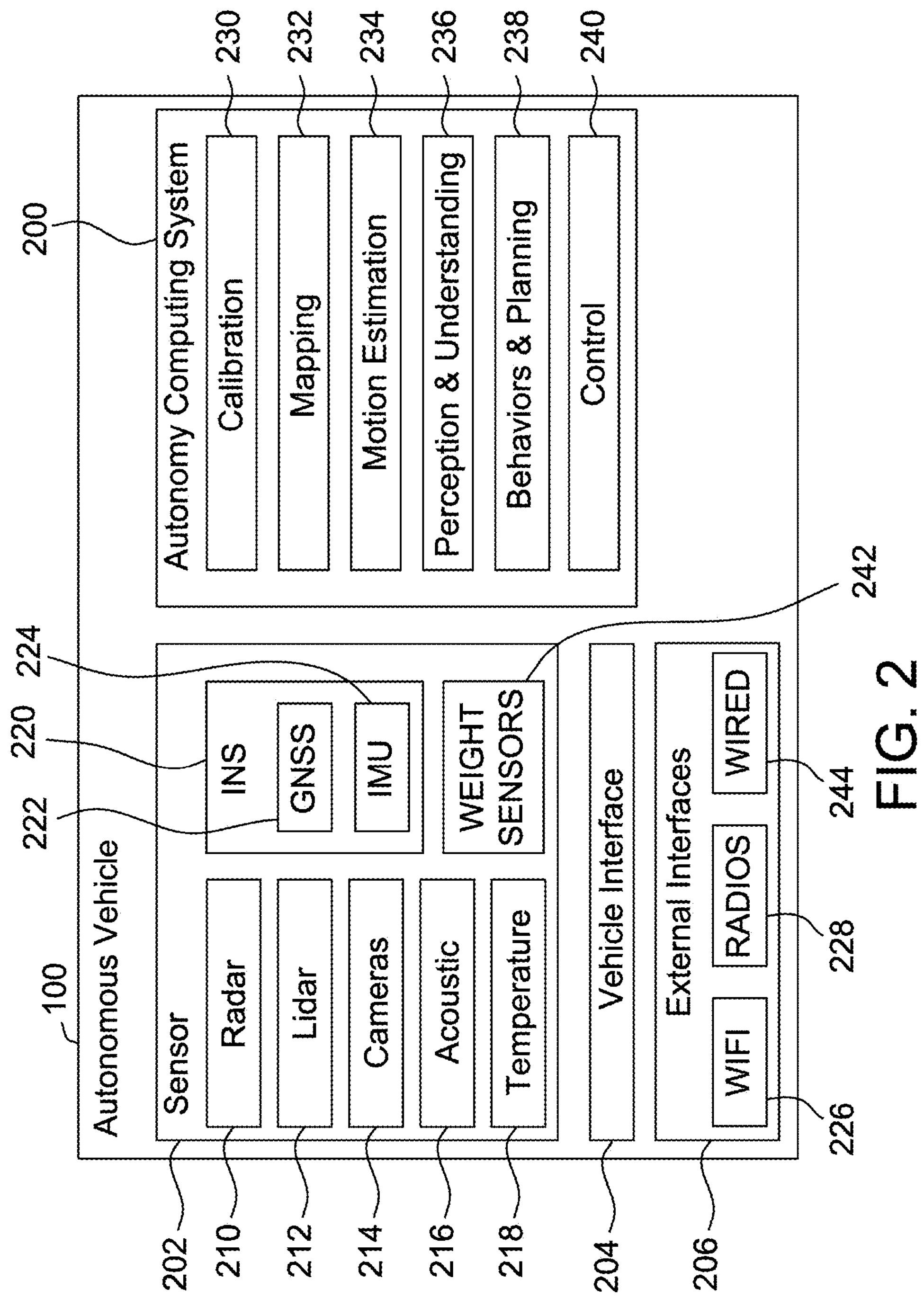
FIG. 2 is a block diagram of an autonomous vehicle.

FIG. 1 is a schematic diagram of an autonomous vehicle 100. FIG. 2 is a block diagram of autonomous vehicle 100 shown in FIG. 1. In the example embodiment, autonomous vehicle 100 includes autonomy computing system 200, sensors 202, a vehicle interface 204, and external interfaces 206.

In the example embodiment, sensors 202 may include various sensors such as, for example, radio detection and ranging (RADAR) sensors 210, light detection and ranging (LiDAR) sensors 212, cameras 214, acoustic sensors 216, temperature sensors 218, or inertial navigation system (INS) 220, which may include one or more global navigation satellite system (GNSS) receivers 222 and one or more inertial measurement units (IMU) 224. Other sensors 202 not shown in FIG. 2 may include, for example, acoustic (e.g., ultrasound), internal vehicle sensors, meteorological sensors, or other types of sensors. Sensors 202 generate respective output signals based on detected physical conditions of autonomous vehicle 100 and its proximity. As described in further detail below, these signals may be used by autonomy computing system 120 to determine how to control operation of autonomous vehicle 100.

Cameras 214 are configured to capture images of the environment surrounding autonomous vehicle 100 in any aspect or field of view (FOV). The FOV can have any angle or aspect such that images of the areas ahead of, to the side, behind, above, or below autonomous vehicle 100 may be captured. In some embodiments, the FOV may be limited to particular areas around autonomous vehicle 100 (e.g., forward of autonomous vehicle 100, to the sides of autonomous vehicle 100, etc.) or may surround 360 degrees of autonomous vehicle 100. In some embodiments, autonomous vehicle 100 includes multiple cameras 214, and the images from each of the multiple cameras 214 may be stitched or combined to generate a visual representation of the multiple cameras' FOVs, which may be used to, for example, generate a bird's eye view of the environment surrounding autonomous vehicle 100. In some embodiments, the image data generated by cameras 214 may be sent to autonomy computing system 200 or other aspects of autonomous vehicle 100, and this image data may include autonomous vehicle 100 or a generated representation of autonomous vehicle 100. In some embodiments, one or more systems or components of autonomy computing system 200 may overlay labels to the features depicted in the image data, such as on a raster layer or other semantic layer of a high-definition (HD) map.

LiDAR sensors 212 generally include a laser generator and a detector that send and receive a LiDAR signal such that LiDAR point clouds (or "LiDAR images") of the areas ahead of, to the side, behind, above, or below autonomous vehicle 100 can be captured and represented in the LiDAR point clouds. Radar sensors 210 may include short-range RADAR (SRR), mid-range RADAR (MRR), long-range RADAR (LRR), or ground-penetrating RADAR (GPR). One or more sensors may emit radio waves, and a processor may process received reflected data (e.g., raw radar sensor data) from the emitted radio waves. In some embodiments, the system inputs from cameras 214, radar sensors 210, or LiDAR sensors 212 may be fused or used in combination to determine conditions (e.g., locations of other objects) around autonomous vehicle 100.

GNSS receiver 222 is positioned on autonomous vehicle 100 and may be configured to determine a location of autonomous vehicle 100, which it may embody as GNSS data, as described herein. GNSS receiver 222 may be configured to receive one or more signals from a global navigation satellite system (e.g., Global Positioning System (GPS) constellation) to localize autonomous vehicle 100 via geolocation. In some embodiments, GNSS receiver 222 may provide an input to or be configured to interact with, update, or otherwise utilize one or more digital maps, such as an HD map (e.g., in a raster layer or other semantic map). In some embodiments, GNSS receiver 222 may provide direct velocity measurement via inspection of the Doppler effect on the signal carrier wave. Multiple GNSS receivers 222 may also provide direct measurements of the orientation of autonomous vehicle 100. For example, with two GNSS receivers 222, two attitude angles (e.g., roll and yaw) may be measured or determined. In some embodiments, autonomous vehicle 100 is configured to receive updates from an external network (e.g., a cellular network). The updates may include one or more of position data (e.g., serving as an alternative or supplement to GNSS data), speed/direction data, orientation or attitude data, traffic data, weather data, or other types of data about autonomous vehicle 100 and its environment.

IMU 224 is a micro-electrical-mechanical (MEMS) device that measures and reports one or more features regarding the motion of autonomous vehicle 100, although other implementations are contemplated, such as mechanical, fiber-optic gyro (FOG), or FOG-on-chip (SiFOG) devices. IMU 224 may measure an acceleration, angular rate, and or an orientation of autonomous vehicle 100 or one or more of its individual components using a combination of accelerometers, gyroscopes, or magnetometers. IMU 224 may detect linear acceleration using one or more accelerometers and rotational rate using one or more gyroscopes and attitude information from one or more magnetometers. In some embodiments, IMU 224 may be communicatively coupled to one or more other systems, for example, GNSS receiver 222 and may provide input to and receive output from GNSS receiver 222 such that autonomy computing system 200 is able to determine the motive characteristics (acceleration, speed/direction, orientation/attitude, etc.) of autonomous vehicle 100.

In the example embodiment, autonomy computing system 200 employs vehicle interface 204 to send commands to the various aspects of autonomous vehicle 100 that actually control the motion of autonomous vehicle 100 (e.g., engine, throttle, steering wheel, brakes, etc.) and to receive input data from one or more sensors 202 (e.g., internal sensors). External interfaces 206 are configured to enable autonomous vehicle 100 to communicate with an external network via, for example, a wired or wireless connection, such as Wi-Fi 226 or other radios 228. In embodiments including a wireless connection, the connection may be a wireless communication signal (e.g., Wi-Fi, cellular, LTE, 5*g*, Bluetooth, etc.).

In some embodiments, external interfaces 206 may be configured to communicate with an external network via a wired connection 244, such as, for example, during testing of autonomous vehicle 100 or when downloading mission data after completion of a trip. The connection(s) may be used to download and install various lines of code in the form of digital files (e.g., HD maps), executable programs (e.g., navigation programs), and other computer-readable code that may be used by autonomous vehicle 100 to navigate or otherwise operate, either autonomously or semi-autonomously. The digital files, executable programs, and other computer readable code may be stored locally or remotely and may be routinely updated (e.g., automatically or manually) via external interfaces 206 or updated on demand. In some embodiments, autonomous vehicle 100 may deploy with all of the data it needs to complete a mission (e.g., perception, localization, and mission planning) and may not utilize a wireless connection or other connection while underway.

In the example embodiment, autonomy computing system 200 is implemented by one or more processors and memory devices of autonomous vehicle 100. Autonomy computing system 200 includes modules, which may be hardware components (e.g., processors or other circuits) or software components (e.g., computer applications or processes executable by autonomy computing system 200), configured to generate outputs, such as control signals, based on inputs received from, for example, sensors 202. These modules may include, for example, a calibration module 230, a mapping module 232, a motion estimation module 234, a perception and understanding module 236, a behaviors and planning module 238, and a control module or controller 240. These modules may be implemented in dedicated hardware such as, for example, an application specific integrated circuit (ASIC), field programmable gate array (FPGA), or microprocessor, or implemented as executable software modules, or firmware, written to memory and executed on one or more processors onboard autonomous vehicle 100.

Autonomy computing system 200 of autonomous vehicle 100 may be completely autonomous (fully autonomous) or semi-autonomous. In one example, autonomy computing system 200 can operate under Level 5 autonomy (e.g., full driving automation), Level 4 autonomy (e.g., high driving automation), or Level 3 autonomy (e.g., conditional driving automation). As used herein the term "autonomous" includes both fully autonomous and semi-autonomous.

In the example embodiment, sensors further include weight sensors 242, which are disposed in a cargo bed area of autonomous vehicle 100, such as a cargo bed surface of a trailer coupled to autonomous vehicle 100 (e.g., if autonomous vehicle 100 is a tractor-trailer) or integrated into autonomous vehicle 100 (e.g., if autonomous vehicle 100 is a van, box truck, or other truck with an integrated cargo area). Examples of weight sensors 242 include capacitance sensors, piezoelectric sensors, piezoresistive sensors, elastoresistivity sensors, optical sensors, touch switches, electronic scales, or other sensors capable of detecting a weight or presence of items placed on the cargo bed surface. Weight sensors 242 are coupled in communication with autonomy computing system via wired communication (e.g., CAN, overleaved power lines), wireless communication (e.g., Wi-Fi, cellular, LTE, 5*g*, Bluetooth, etc.), or some combination thereof.

Weight sensors 242 are arranged on the cargo bed surface in a mesh, grid, or other arrangement enabling weight to be detected at different locations throughout the cargo bed surface. Weight sensors 242 can be embedded into the cargo bed surface or laid on top of the cargo bed surface, for example, as a mat. In some embodiments, weight sensors 242 are configured to return a Boolean value indicating whether some threshold level of weight is applied to weight sensors 242. Additionally or alternatively, in certain embodiments, at least some of weight sensors 242 are configured to generate a weight measurement value based upon a weight applied to weight sensors 242.

In the example embodiment, autonomy computing system 200 is configured to receive weight data from weight sensors 242 and generate a weight distribution map of the cargo bed surface based on the received weight data. In certain embodiments, the weight data is received continuously or periodically during driving, and the weight distribution map is updated continuously or periodically based on newly received weight data.

The weight distribution map includes an array of weight values corresponding to different locations throughout the cargo bed surface. In some embodiments, the weight values are Boolean values indicating whether there is a threshold level of weight is applied to weight sensors 242 and therefore likely an object present at the location of the corresponding weight sensors 242. Based on this information, autonomy computing system 200 can determine where objects are located throughout the cargo bed surface and determine a weight distribution. In certain embodiments, the weight values include additional information, such as weight measurements. In some embodiments, autonomy computing system 200 is configured to perform data enhancement on the generated weight distribution map. For example, autonomy computing system 200 may apply filters, machine learning models, or data fusion utilizing different types of sensor data to generate additional data based on the data received from weight sensors 242.

In the example embodiment, autonomy computing system 200 is configured to control operation of autonomous vehicle 100 based in part on the generated weight distribution map. For example, behaviors and planning module 238 or control module 240 may utilize the weight distribution map as an input in planning or determining control operations for autonomous vehicle 100. In other words, autonomy computing system 200 can control autonomous vehicle differently depending on the weight distribution, which may result in autonomous vehicle 100 having different handling characteristics. In some embodiments, autonomy computing system 200 utilizes a machine learning model trained based on sample weight distribution maps to determine control operations for autonomous vehicle 100.

In some embodiments, autonomy computing system 200 is configured to identify alert conditions or generate alerts based on the weight distribution map, for example, by comparing the weight distribution map to alert parameters. For example, autonomy computing system 200 may determine that the weight distribution map indicates autonomous vehicle 100 is loaded in an unsafe or improper manner, or that a load has shifted during driving. Based on this determination, autonomy computing system 200 can determine whether it is safe to continue driving and control autonomous vehicle 100 accordingly or alert operators (e.g., drivers or remote operators) of autonomous vehicle 100.

Figure 3:
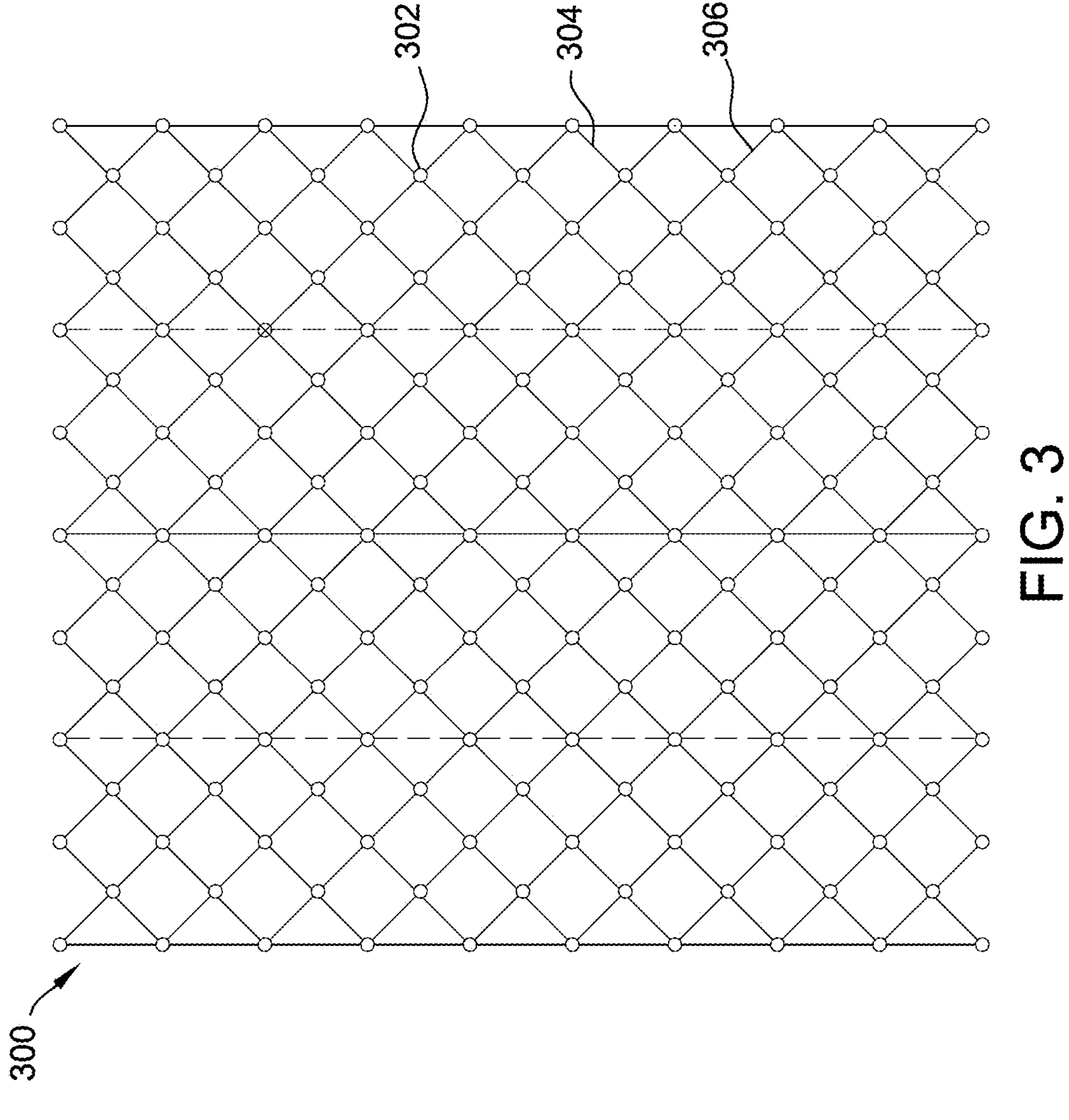
FIG. 3 is an example sensor grid for use with the autonomous vehicle shown in FIGS. 1 and 2.

FIG. 3 is a simplified representation of a grid 300 of a plurality of capacitance sensors 302. Grid 300 is an example arrangement of weight sensors 242, with each capacitance sensor 302 serving as a weight sensor 242, and can be positioned on or within the cargo bed surface associated with autonomous vehicle 100. Grid 300 includes a plurality of first wires 304 and a plurality of second wires 306. While illustrated in FIG. 3 as arranged to run diagonally in orthogonal directions while overlapping, first wires 304 and second wires 306 can be arranged in other ways that enable a first wire 304 and second wire 306 to overlap at each capacitance sensor 302. The overlapping area of first wires 304 and second wires 306 form capacitance sensors 302, with vertical gap distance between first wires 304 and second wires 306 being filled with one or more dielectric materials as described herein.

When a voltage is applied to a capacitance sensor 302 via a first wire 304 and a second wire 306, for example, having a positive bias connected to the first electrode of the capacitance sensor 302 and a negative bias connected to a second electrode of the capacitance sensor, an electric field is generated around the capacitance sensor 302. An object such as a cargo load item coming in proximity of the capacitance sensor 302 may cause a change in the electric field and thereby change in the capacitance value of the capacitance sensor 302. By way of a non-limiting example, the change in the capacitance value of the capacitance sensor 302 may be periodically measured and reported to autonomy computing system 200.

Figure 4:
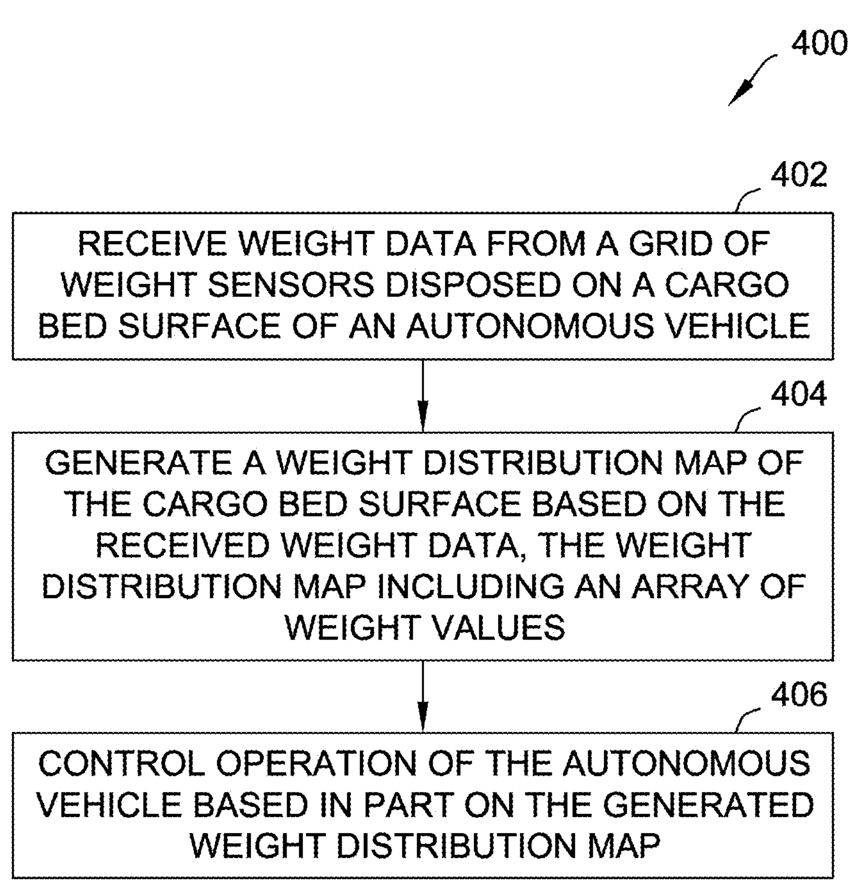
FIG. 4 is a flowchart of an example method for monitoring a load distribution of an autonomous vehicle.

FIG. 4 is a flow chart depicting an example method 400 for monitoring a load distribution of autonomous vehicle 100 (shown in FIGS. 1 and 2). In the example embodiment, method 400 is performed by autonomy computing system 200 (shown in FIG. 2). Autonomy computing system 200 receives 402 weight data from a grid of weight sensors 242 disposed on a cargo bed surface of autonomous vehicle 100. Autonomy computing system 200 generates 404 a weight distribution map of the cargo bed surface based on the received weight data. The weight distribution map includes an array of weight values. Autonomy computing system 200 controls 406 operation of autonomous vehicle 100 based in part on the generated weight distribution map.

In certain embodiments, the grid of weight sensors 242 includes a plurality of capacitance sensors 302. In some such embodiments, the grid includes a plurality of first wires 304 and a plurality of second wires 306. In such embodiments, each of second wires 306 overlap over one or more of first wires 304 at a respective overlapping area. In such embodiments, the grid further includes a dielectric material disposed in a vertical gap at each respective overlapping area forming a capacitance sensor 302 including a first electrode and a second electrode. The first electrode corresponds with a first wire 304 and a second wire 306.

In some embodiments, to control operation of autonomous vehicle 100 based in part on the generated weight distribution map, autonomy computing system 200 executes a machine learning model trained based in part on a plurality of sample weight distribution maps.

In certain embodiments, autonomy computing device determines an alert condition is present based upon a comparison between the weight distribution map and one or more alert parameters.

In some embodiments, autonomy computing system 200 receives the weight data continuously or periodically. In some such embodiments, autonomy computing system 200 updates the weight distribution map based on the received weight data continuously or periodically.

Figure 5:
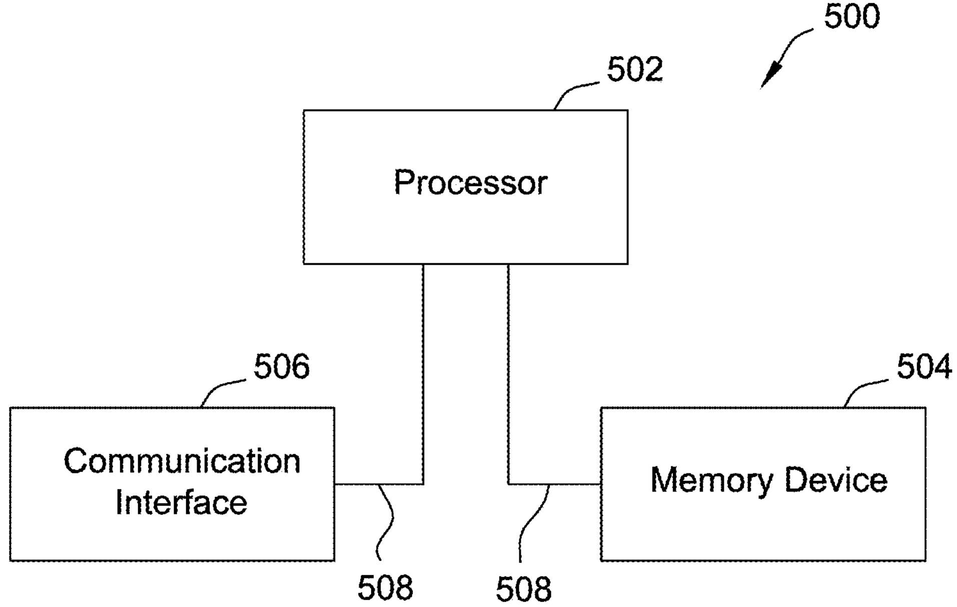
FIG. 5 is a block diagram of an example computing device.

FIG. 5 is a block diagram of an example computing device 500. Computing device 500 includes a processor 502 and a memory device 504. The processor 502 is coupled to the memory device 504 via a system bus 508. The term "processor" refers generally to any programmable system including systems and microcontrollers, reduced instruction set computers (RISC), complex instruction set computers (CISC), application specific integrated circuits (ASIC), programmable logic circuits (PLC), and any other circuit or processor capable of executing the functions described herein. The above examples are example only, and thus are not intended to limit in any way the definition or meaning of the term "processor."

In the example embodiment, the memory device 504 includes one or more devices that enable information, such as executable instructions or other data (e.g., sensor data), to be stored and retrieved. Moreover, the memory device 504 includes one or more computer readable media, such as, without limitation, dynamic random access memory (DRAM), static random access memory (SRAM), a solid state disk, or a hard disk. In the example embodiment, the memory device 504 stores, without limitation, application source code, application object code, configuration data, additional input events, application states, assertion statements, validation results, or any other type of data. The computing device 500, in the example embodiment, may also include a communication interface 506 that is coupled to the processor 502 via system bus 508. Moreover, the communication interface 506 is communicatively coupled to data acquisition devices.

In the example embodiment, processor 502 may be programmed by encoding an operation using one or more executable instructions and providing the executable instructions in the memory device 504. In the example embodiment, the processor 502 is programmed to select a plurality of measurements that are received from data acquisition devices.

In operation, a computer executes computer-executable instructions embodied in one or more computer-executable components stored on one or more computer-readable media to implement aspects of the disclosure described or illustrated herein. The order of execution or performance of the operations in embodiments of the disclosure illustrated and described herein is not essential, unless otherwise specified. That is, the operations may be performed in any order, unless otherwise specified, and embodiments of the disclosure may include additional or fewer operations than those disclosed herein. For example, it is contemplated that executing or performing a particular operation before, contemporaneously with, or after another operation is within the scope of aspects of the disclosure.

An example technical effect of the methods, systems, and apparatus described herein includes at least one of: (a) generating a load distribution map using a grid or mesh of sensors disposed on a cargo bed surface of a vehicle or trailer; (b) controlling an autonomous vehicle based on a load distribution map generated using a grid or mesh of sensors disposed on a cargo bed surface of a vehicle or trailer; or (c) identifying alert conditions relating to a load distribution of an autonomous vehicle based on a load distribution map generated using a grid or mesh of sensors disposed on a cargo bed surface of a vehicle or trailer.

Some embodiments involve the use of one or more electronic processing or computing devices. As used herein, the terms "processor" and "computer" and related terms, e.g., "processing device," and "computing device" are not limited to just those integrated circuits referred to in the art as a computer, but broadly refers to a processor, a processing device or system, a general purpose central processing unit (CPU), a graphics processing unit (GPU), a microcontroller, a microcomputer, a programmable logic controller (PLC), a reduced instruction set computer (RISC) processor, a field programmable gate array (FPGA), a digital signal processor (DSP), an application specific integrated circuit (ASIC), and other programmable circuits or processing devices capable of executing the functions described herein, and these terms are used interchangeably herein. These processing devices are generally "configured" to execute functions by programming or being programmed, or by the provisioning of instructions for execution. The above examples are not intended to limit in any way the definition or meaning of the terms processor, processing device, and related terms.

The various aspects illustrated by logical blocks, modules, circuits, processes, algorithms, and algorithm steps described above may be implemented as electronic hardware, software, or combinations of both. Certain disclosed components, blocks, modules, circuits, and steps are described in terms of their functionality, illustrating the interchangeability of their implementation in electronic hardware or software. The implementation of such functionality varies among different applications given varying system architectures and design constraints. Although such implementations may vary from application to application, they do not constitute a departure from the scope of this disclosure.

Aspects of embodiments implemented in software may be implemented in program code, application software, application programming interfaces (APIs), firmware, middleware, microcode, hardware description languages (HDLs), or any combination thereof. A code segment or machine-executable instruction may represent a procedure, a function, a subprogram, a routine, a subroutine, a module, a software package, a class, or any combination of instructions, data structures, or program statements. A code segment may be coupled to, or integrated with, another code segment or an electronic hardware by passing or receiving information, data, arguments, parameters, memory contents, or memory locations. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the claimed features or this disclosure. Thus, the operation and behavior of the systems and methods were described without reference to the specific software code being understood that software and control hardware can be designed to implement the systems and methods based on the description herein.

When implemented in software, the disclosed functions may be embodied, or stored, as one or more instructions or code on or in memory. In the embodiments described herein, memory includes non-transitory computer-readable media, which may include, but is not limited to, media such as flash memory, a random access memory (RAM), read-only memory (ROM), erasable programmable read-only memory (EPROM), electrically erasable programmable read-only memory (EEPROM), and non-volatile RAM (NVRAM). As used herein, the term "non-transitory computer-readable media" is intended to be representative of any tangible, computer-readable media, including, without limitation, non-transitory computer storage devices, including, without limitation, volatile and non-volatile media, and removable and non-removable media such as a firmware, physical and virtual storage, CD-ROM, DVD, and any other digital source such as a network, a server, cloud system, or the Internet, as well as yet to be developed digital means, with the sole exception being a transitory propagating signal. The methods described herein may be embodied as executable instructions, e.g., "software" and "firmware," in a non-transitory computer-readable medium. As used herein, the terms "software" and "firmware" are interchangeable and include any computer program stored in memory for execution by personal computers, workstations, clients, and servers. Such instructions, when executed by a processor, configure the processor to perform at least a portion of the disclosed methods.

As used herein, an element or step recited in the singular and proceeded with the word "a" or "an" should be understood as not excluding plural elements or steps unless such exclusion is explicitly recited. Furthermore, references to "one embodiment" of the disclosure or an "exemplary" or "example" embodiment are not intended to be interpreted as excluding the existence of additional embodiments that also incorporate the recited features. Likewise, limitations associated with "one embodiment" or "an embodiment" should not be interpreted as limiting to all embodiments unless explicitly recited.

Disjunctive language such as the phrase "at least one of X, Y, or Z," unless specifically stated otherwise, is generally intended, within the context presented, to disclose that an item, term, etc. may be either X, Y, or Z, or any combination thereof (e.g., X, Y, and/or Z). Likewise, conjunctive language such as the phrase "at least one of X, Y, and Z," unless specifically stated otherwise, is generally intended, within the context presented, to disclose at least one of X, at least one of Y, and at least one of Z.

The disclosed systems and methods are not limited to the specific embodiments described herein. Rather, components of the systems or steps of the methods may be utilized independently and separately from other described components or steps.

This written description uses examples to disclose various embodiments, which include the best mode, to enable any person skilled in the art to practice those embodiments, including making and using any devices or systems and performing any incorporated methods. The patentable scope is defined by the claims and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A system for monitoring a load distribution of an autonomous vehicle, the system comprising a processor in communication with a memory device, the processor configured to:

- receive weight data from a grid of weight sensors disposed on a cargo bed surface of the autonomous vehicle, wherein the grid of weight sensors includes:
  - a plurality of capacitance sensors;
  - a plurality of first wires;
  - a plurality of second wires, each of the plurality of second wires overlapping over one or more wires of the plurality of first wires at a respective overlapping area; and
  - a dielectric material disposed in a vertical gap at each respective overlapping area forming a capacitance sensor of the plurality of capacitance sensors, the capacitance sensor including a first electrode and a second electrode, the first electrode corresponding with a wire of the plurality of first wires and the second electrode corresponding with a wire of the plurality of second wires;
- generate a weight distribution map of the cargo bed surface based on the received weight data, the weight distribution map including an array of weight values; and
- control operation of the autonomous vehicle based in part on the generated weight distribution map.

2. The system of claim 1, wherein to control operation of the autonomous vehicle based in part on the generated weight distribution map, the processor is configured to execute a machine learning model trained based in part on a plurality of sample weight distribution maps.

3. The system of claim 1, wherein the processor is further configured to determine an alert condition is present based upon a comparison between the weight distribution map and one or more alert parameters.

4. The system of claim 1, wherein the processor is further configured to receive the weight data continuously or periodically.

5. The system of claim 4, wherein the processor is further configured to update the weight distribution map based on the received weight data continuously or periodically.

6. A method for monitoring a load distribution of an autonomous vehicle, method comprising:

receiving weight data from a grid of weight sensors disposed on a cargo bed surface of the autonomous vehicle, wherein the grid of weight sensors includes:

a plurality of capacitance sensors;

a plurality of first wires;

a plurality of second wires, each of the plurality of second wires overlapping over one or more wires of the plurality of first wires at a respective overlapping area; and a dielectric material disposed in a vertical gap at each respective overlapping area forming a capacitance sensor of the plurality of capacitance sensors, the capacitance sensor including a first electrode and a second electrode, the first electrode corresponding with a wire of the plurality of first wires and the second electrode corresponding with a wire of the plurality of second wires;

generating a weight distribution map of the cargo bed surface based on the received weight data, the weight distribution map including an array of weight values; and controlling operation of the autonomous vehicle based in part on the generated weight distribution map.

7. The method of claim 6, wherein controlling operation of the autonomous vehicle based in part on the generated weight distribution map comprises executing a machine learning model trained based in part on a plurality of sample weight distribution maps.

8. The method of claim 6, further comprising determining an alert condition is present based upon a comparison between the weight distribution map and one or more alert parameters.

9. The method of claim 6, further comprising receiving the weight data continuously or periodically.

10. The method of claim 9, further comprising updating the weight distribution map based on the received weight data continuously or periodically.

11. A sensor system for monitoring a load distribution of an autonomous vehicle, the sensor system comprising:

a grid of weight sensors disposed on a cargo bed surface of the autonomous vehicle, the grid of weight sensors comprising:

a plurality of capacitance sensors;

a plurality of first wires;

a plurality of second wires, each of the plurality of second wires overlapping over one or more wires of the plurality of first wires at a respective overlapping area; and a dielectric material disposed in a vertical gap at each respective overlapping area forming a capacitance sensor of the plurality of capacitance sensors, the capacitance sensor including a first electrode and a second electrode, the first electrode corresponding with a wire of the plurality of first wires and the second electrode corresponding with a wire of the plurality of second wires;

a memory device; and a processor in communication with the grid of weight sensors and the memory device, the processor configured to:

receive weight data from the grid of weight sensors;

generate a weight distribution map of the cargo bed surface based on the received weight data, the weight distribution map including an array of weight values; and control operation of the autonomous vehicle based in part on the generated weight distribution map.

12. The sensor system of claim 11, wherein to control operation of the autonomous vehicle based in part on the generated weight distribution map, the processor is configured to execute a machine learning model trained based in part on a plurality of sample weight distribution maps.

13. The sensor system of claim 11, wherein the processor is further configured to determine an alert condition is present based upon a comparison between the weight distribution map and one or more alert parameters.

14. The sensor system of claim 11, wherein the processor is further configured to receive the weight data continuously or periodically.

15. The sensor system of claim 14, wherein the processor is further configured to update the weight distribution map based on the received weight data continuously or periodically.

* * * * *